K. JACQUET.
CURRENT COLLECTOR CONTRIVANCE.
APPLICATION FILED MAY 2, 1921.
1,426,388. Patented Aug. 22, 1922.
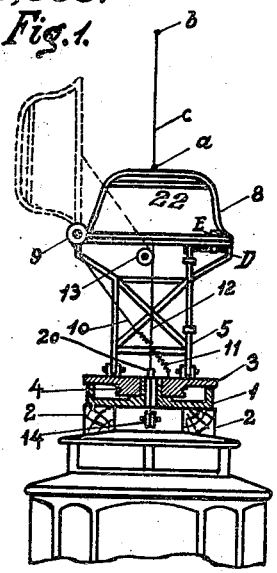
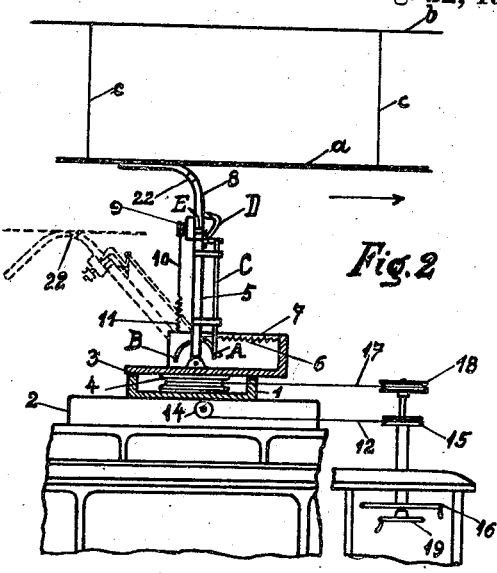
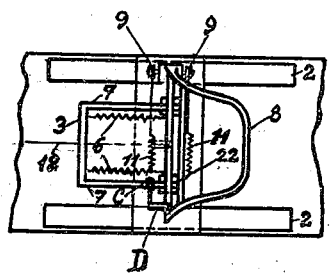
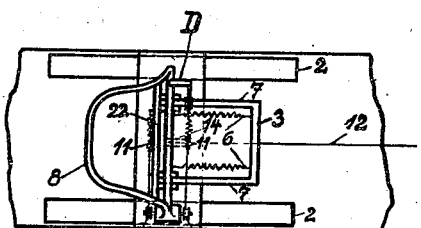
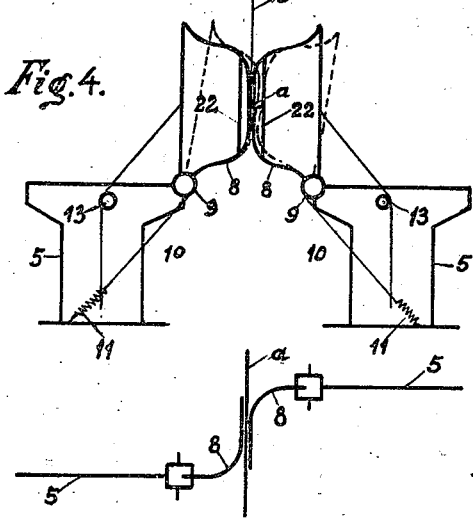
INVENTOR
KARL JACQUET
his ATTORNEY.

UNITED STATES PATENT OFFICE.

KARL JACQUET, OF ZURICH, SWITZERLAND.

CURRENT-COLLECTOR CONTRIVANCE.

1,426,388.  Specification of Letters Patent.  Patented Aug. 22, 1922.

Application filed May 2, 1921. Serial No. 466,374.

*To all whom it may concern:*

Be it known that I, KARL JACQUET, citizen of Switzerland, residing at Zurich, Switzerland, have invented certain new and useful Improvements in a Current-Collector Contrivance, of which the following is a specification.

My invention relates generally to overhead current collectors for electrically propelled railway cars and has reference more particularly to a type of current collector which is adjustable to operate with a trolley wire disposed over the center line between the rails or to contact with a trolley wire suspended over a center line between two sets of rails and at the side of the car.

The object of the invention is to provide an apparatus of this character which is reliable in operation and applicable to any car operating from the overhead trolley system.

The invention consists in the novel features of construction, combinations and arrangements of parts fully described in the following specification and clearly set forth in the appended claims.

The invention is illustratively exemplified in the accompanying drawing, in which:

Fig. 1 is a front elevational view of a portion of a car showing the current collector in position to operate with a trolley wire located over the center of the car and in dotted lines the collector is shown in position to receive current from a trolley wire disposed at the side of the center of the car.

Fig. 2 is a side elevational view of the parts shown in Figure 1, with parts broken away to show interior construction, and in dotted lines the collector is shown in adjusted position to accommodate a low hanging trolley wire.

Fig. 3 is a broken plan view of the roof of a car showing the latter equipped with two current collectors of the present type.

Fig. 4 is a diagrammatic view of the positions assumed by the bows of the current collectors of two cars when they are operated from a single wire suspended between the two sets of rails and especially when the two cars are in the position of passing each other.

Fig. 5 is a diagrammatic view, shown in plan, of the collecting bows in the positions shown in Figure 4.

Referring to the drawing, 1 denotes a fixed bed plate supported on suitable wooden sleepers 2 which are secured to the roof of a car. The bed plate 1 is a hollow annular member having an upstanding central hub, which projects to a level substantially on a plane with the edge of the outer wall, and which provides a bearing about which is loosely mounted a turntable 3. The turntable 3 comprises a circular disc of a slightly greater diameter than that of the bed plate 1 and a depending pulley 4 provided with a continuous groove to receive an operating cable, as hereinafter described. The pulley 4 operates within the hollow portion of the bed plate 1 to rotate the turntable 3 to any desired position.

The upper face of the turntable 3 is provided with bearing lugs disposed at opposite sides of the center of the turntable to pivotally support the lower ends of a frame 5, which consists of two parallel members suitably braced by cross pieces projecting between the two members. The upper ends of the two parallel members are bent outwardly and in opposite directions to receive the lower edge of the current collector bow 8. In order to yieldably support the frame in its upright position, as shown in Figure 2, a pair of springs 6 are connected at their forward ends to a stop plate 7 and at their opposite ends to the frame 5.

The right hand lower edge of the current collector bow 8 is pivotally connected to the forked end of the frame 5, as shown in Figure 1, and is provided with a pair of pulleys 9 projecting from opposite sides of the frame. The pulleys 9 are movable with the bow 8 about the axis of its pivot so that rotary movement of the pulleys will tend to raise the collector bow 8 to the dotted position shown in Figure 1. The normal position of the bow 8 is in a horizontal plane, but in order to raise it about the pivot and then to hold this position I provide two cables 10, the lower ends of which are attached to suitable springs 11 carried by the turntable 3, and the upper ends of which are wound about and attached to the pulleys 9. With this construction it will be noted that the normal tendency of these springs 11 will be to unwind the cables 10 from the pulleys 9, rotating the latter and raising the bow 8 to a vertical position. The bow 8 is held in normal position, i. e. horizontally with respect to the frame 5 and against the tension of the springs 11, by means of a cable 12 attached at one end to the bottom portion of the bow 8 and the other end, which is threaded over a pulley 13 mounted at the top of the frame 5, extends downwardly and through an opening in the center of the hub carried by the bed plate 1. The cable 12 then passes over a pulley 14, mounted between the wooden sleepers 2, to a winding drum 15 which is fixed to the upper end of a hollow shaft operating in a vertical position in the roof of the operator's compartment, and which is controlled by a hand wheel 16 carried by the lower end of the hollow shaft projecting into the car and within reach of the operator. Rotary movement of the turntable 3 is effected by a cable 17, received at one end about the pulley 4 and the other end being projected forward and about a pulley 18; the latter being mounted on a shaft operating in the hollow shaft and projecting below the hand wheel 16 to receive a hand wheel 19. In order that the cable 12 may not become twisted during rotary movement of the turntable 3, the portion of the cable between the pulleys 13 and 14 is provided with a swivel 20, which will permit the upper section of the cable to rotate freely, while the lower portion will not turn. With the usual types of cars only one collector is provided, in which case the turntables must be capable of 180° movement about their axes so that the cars may be operated in either direction.

The overhead trolley system comprises the usual pole line wire $a$ supported below a cable $b$ by means of depending guy wires $c$ and the entire system may be disposed either above the center of the car or at the side of the car between the two sets of rails. It has even been found necessary to run part of the system over the center line of the rails while other sections of the line may be arranged at the side of the cars in which case the collector will operate automatically and constantly remain in contact with the pole line wire $a$.

Referring to Figure 2, it will be noted that the current collector bow 8 is bent at its upper end to substantially right angles and with a gentle curve between the vertical and horizontal portions of the bow.

The two arms of the bow, at the points of the curve between the vertical and horizontal portions, are joined to the opposite ends of a bridge piece 22, which is brought into use when the frame 5 has been depressed, to the dotted position shown in Figure 2, so that the current from the pole line wire $a$ may continue to flow to the current collector bow 8 through the bridge piece 22. In places where it is necessary to run the pole line wire $a$ at a very low level, as through tunnels or under bridges, the wire is usually hung over the center line between the rails, so that it would not be necessary to operate the bow 8 in its vertical position.

Therefore, in order that the bow 8 may not swing about its pivot under tension of the spring 11, during the period described above, I have provided an automatically operated locking device which is intended to engage the free end of the bow when the latter is arranged at an angle with the frame 5, and which will hold the bow 8 against possible arcuate movement except when the latter is in horizontal position. The lock consists of a pin A projecting into a guide slot B in the wall of the member 7, and a slidable rod C arranged substantially parallel to and extending to the upper end of the frame 5. The upper end of the rod C is pivotally connected to an arm of a hook D, which is pivoted at its central portion to the edge of the frame 5, and which is adapted to engage over a keeper E carried by the bow 8.

The operation of the invention is substantially as follows:—Assuming that the car has reached the end of the line and there is no means for turning the car around, it is necessary to reverse the current collector bow 8, i. e. with the free end of the horizontal portion of the bow directed towards the rear of the car. The operator will first turn the hand wheel 16 until the cable 12 has drawn the bow 8 downwardly against the frame 5, the hand wheel 19 will then be rotated until the belt 17 has moved the pulley 4 and turntable 3 a distance of 180° (degrees) and the frame is then supporting the bow 8 to operate against the pole line wire $a$ in the opposite direction. The hand wheel 16 may then be released and the pressure of the bow 8 brought to bear against the pole line wire. It will be noted that with the bow 8 exerting a constant pressure against the pole line wire $a$, the latter may be either over the center line between the rails or at the side car, and the bow 8 will follow the line anywhere within the radius of its possible movement.

Where this type of collector is used with a double track system and a single pole line wire is arranged between the two sets of rails, as indicated in Figures 4 and 5, the contact of each bow 8 with the wire $a$ must be such that when one car passes another car the two opposing bows will not contact with each other in passing. This operation is made possible by the manner in which each bow 8 is pivoted, so that if the wire $a$ is pressed either to one side or the other of a center line between the two sets of rails, the bows will move about their pivots a distance relative to the distance the wire $a$ is away from the axes of the pivots, in which case with two bows in the position to pass each other and the wire slightly off center the bows will remain parallel to each other at the point of passing. With the bows 8 held parallel to each other the space between them will always be equal to the gauge of the pole line wire itself.

In the operation of the locking device any downward arcuate movement of the frame 5 and rod C will cause the pin A to travel upward in the curved slot B to rock the hook D over the keeper E. When the pole line wire a again assumes its normal height the frame 5 and rod C will move to an upright position and the hook D will be withdrawn from the keeper E.

It may be desirable under certain conditions to equip a single car with two current collectors, as shown in Figure 3, and in doing this it is suggested that the bows pivot on opposite sides of the car, so that the pole line wire may be arranged from the center line between the rails to either side of the rails and still be within reach of one of the bows 8.

I claim:—

1. In a current collector for electrically operated railway cars, the combination with a yieldably supported upright frame, of a contact member carried by and pivoted at one end thereof to said frame, operating means between the pivotal connection of the contact member and a fixed point in said collector to move the former relatively to said frame and against a pole line wire, and means for rotating said frame to reverse the position of said contact member with respect to the pole line wire.

2. In a current collector for electrically operated railway cars, the combination with a rotatable member mounted on the roof of a car, a pivotally mounted frame carried by said rotatable member and yieldably supported in upright position, a contact member pivotally connected at one side thereof to the upright frame and adapted to move at an angle with respect to the said frame, yieldable means connected between the pivotal conection of said contact member and the rotatable member to normally tend to rotate the former about its pivot to an upright position, and means coacting with said rotatable member to revolve the latter about its axis.

3. In a current collector for electrically operated railway cars, the combination with a contact member comprising a bow shape piece provided with an angular portion at its closed end adapted to engage with a pole line wire, of a bridge piece connected at its opposite ends to the parallel arms of said bow, a frame pivotally supporting said bow, spring actuated means cooperating with the pivotal support of the bow and tending to hold the latter in upright position, whereby the closed portion of said bow may be constantly in contact with the pole line wire, and a control mechanism mounted in the car and connected with the bow to operate the latter against the action of the spring actuated means.

4. In a current collector for electrically operated railway cars, the combination with a supporting frame pivotally mounted above the roof of a car, of a contact bow pivoted at one side to said frame, spring actuated means engaged with said bow to yieldably support the latter in upright position about its pivot, springs connected between the frame and pivotal mounting of the latter to yieldably hold the frame in substantially upright position, and automatically operated locking means carried by said frame and adapted to lock the free end of the bow to the frame when the latter is depressed arcuately about its pivot under pressure of a low hanging pole line wire.

5. In a current collector for electrically operated railway cars, the combination with a pivotally supported frame yieldably held in upright position, of a contact bow pivoted at one end to the frame and yieldably pressed upwards about the pivot to engage with a pole line wire within the possible path of movement of said bow, and means actuated by downward arcuate movement of the frame to lock the bow to the former, whereby possible independent relative movement of the bow with respect to the frame during a depressed position of the latter will be avoided.

In testimony whereof I hereunto affix my signature in presence of two witnesses.

KARL JACQUET.

Witnesses:
 OSCAR ZEIDER,
 ARNOLD WAECHTER.